United States Patent
Andersson

(10) Patent No.: US 7,075,479 B2
(45) Date of Patent: Jul. 11, 2006

(54) RADAR LEVEL-MEASURING DEVICE

(75) Inventor: Agne Andersson, Torslanda (SE)

(73) Assignee: Saab Rosemount Tank Radar AB, Gothenburg (SE)

( * ) Notice: Subject to any disclaimer, the term of this patent is extended or adjusted under 35 U.S.C. 154(b) by 0 days.

(21) Appl. No.: 10/488,204

(22) PCT Filed: Aug. 27, 2002

(86) PCT No.: PCT/SE02/01534

§ 371 (c)(1), (2), (4) Date: Sep. 24, 2004

(87) PCT Pub. No.: WO03/019121

PCT Pub. Date: Mar. 6, 2003

(65) Prior Publication Data

US 2005/0017895 A1  Jan. 27, 2005

(30) Foreign Application Priority Data

Aug. 30, 2001  (SE) ..................... 0102881

(51) Int. Cl.
*G01F 23/284* (2006.01)
*G01S 13/08* (2006.01)
(52) U.S. Cl. ............. 342/124; 342/118; 342/175; 342/188; 342/195; 73/290 R; 73/304 R
(58) Field of Classification Search ............. 342/118, 342/124, 175, 188–197; 73/290 R, 304 R, 73/304 C, 305–322, 322.5
See application file for complete search history.

(56) References Cited

U.S. PATENT DOCUMENTS 4,254,482 A * 3/1981 Newman .................... 342/124
4,621,264 A * 11/1986 Yashiro et al. .............. 342/124
4,641,139 A    2/1987 Edvardsson ................. 342/124
5,136,299 A * 8/1992 Edvardsson ................. 342/124
5,305,237 A * 4/1994 Dalrymple et al. ......... 342/124
5,420,591 A * 5/1995 Annee et al. ............... 342/188
5,543,720 A * 8/1996 Edvardsson ................. 342/124
5,629,706 A * 5/1997 B.ang..ang.th .............. 342/124

(Continued)

FOREIGN PATENT DOCUMENTS

WO    WO 90/09599    8/1990

(Continued)

Primary Examiner—Bernarr E. Gregory
(74) Attorney, Agent, or Firm—Westman, Champlin & Kelly, P.A.

(57) ABSTRACT

A method and a device for measuring, by means of radar, in an enclosed space (1) in which a liquid (2) is stored, the level of a liquid surface (6), where the method involves the steps: a radar unit (3) mounted on the roof (4) of the enclosed space transmits a microwave signal downwards into the enclosed space (1) through a waveguide (7) that communicates with the liquid in the enclosed space; the transmitted microwave signal's polarization alters according to a predetermined time sequence in such a way that the signal is propagated alternatively at least in a first and a second plane of polarization; the signal transmitted in the first plane of polarization is reflected by the liquid surface (6) back to the radar unit (3); the signal in the second plane of polarization is reflected by at least one reference transmitter placed at a known distance from the radar unit; a calculating unit calculates the level of the liquid surface based partly on the propagation time for the microwave signal, i.e. for the time between the signals emitted and received by the radar unit, partly on the microwave signal's velocity of propagation, which is obtained from measurements in relation to the references.

13 Claims, 1 Drawing Sheet

U.S. PATENT DOCUMENTS

| | | | |
|---|---|---|---|
| 6,184,818 B1 * | 2/2001 | Meinel | 342/124 |
| 6,414,625 B1 * | 7/2002 | Kleman | 342/124 |
| 6,606,904 B1 * | 8/2003 | Muller et al. | 342/124 |
| 6,759,976 B1 * | 7/2004 | Edvardsson | 342/124 |
| 6,759,977 B1 * | 7/2004 | Edvardsson et al. | 342/124 |
| 6,765,524 B1 * | 7/2004 | Kleman | 342/124 |
| 6,795,015 B1 * | 9/2004 | Edvardsson | 342/124 |

FOREIGN PATENT DOCUMENTS

WO     WO 01/02818     1/2001

* cited by examiner

RADAR LEVEL-MEASURING DEVICE

CROSS-REFERENCE TO RELATED APPLICATION

This Application is a Section 371 National Stage Application of International Application No. PCT/SE02/01534, filed 27 Aug. 2002 and published as WO 03/019121 on 6 Mar. 2003, in English which claims priority to Sweden Serial No. 0102881-0, filed 30 Aug. 2001, the contents of which are hereby incorporated by reference in their entirety.

TECHNICAL FIELD

The invention concerns a method and a device for measuring by means of radar the level of the surface of a medium through knowledge of the propagation velocity of the radar-transmitted signal in the atmosphere prevailing above the medium, where the said medium, which is either a liquid or particulate material, is stored in an enclosed space.

STATE OF THE ART

Determination of the level of a liquid or other substance in a container using contact-free methods is well known in the art. An example of a device for contact-free measurement is that described in the patent document U.S. Pat. No. 4,641,139.

In a modern type of radar level-measuring device, a so-called FMCW radar system is used. Such a system uses a carefully monitored frequency sweep, often based on a frequency reference from a crystal and a phase-locked loop (PLL). Using this application allows very good control of the frequency of the radar-transmitted microwave. In an FMCW system, an intermediate frequency (IF) is obtained, which is proportional to the distance to the surface described by the relationship:

$$f = \frac{(F\max - F\min)}{c \times T} \times 2 \times h$$

where
f=output frequency from the microwave receiver/mixer
Fmax=maximum frequency of the sweep
Fmin=minimum frequency of the sweep
c=the electromagnetic wave velocity in the atmosphere prevailing above the medium surface
T=sweep time
h=distance to the surface The type of radar level-measuring device referred to here is used nowadays for measuring levels in marine tanks and storage tanks for liquids or particulate material. The measuring devices are very reliable and offer high precision, the accuracy being such that they can be used to measure a flow into or out of the tank, and thus have even been authorized and approved for flow measurement. In certain types of tank, however, radar level-measuring devices have restricted use or limited accuracy. This is particularly true for so-called LPG tanks (Liquid Petroleum and Gas), where, for example, liquids that exist in the gas phase under atmospheric pressure are stored as pressurized liquid in the tank. Depending on the composition of the gas, the atmospheric conditions above the liquid surface will vary. Thus, a carbohydrate gas, such as propane, with 3 carbon atoms in the molecules (C3 gas) at a temperature of 20° C. can give rise to a pressure in the tank of about 10 bars. If, instead, the tank contents consist of a C5 atomic carbohydrate gas, such as pentane, then the pressure at a temperature of 20° C. above the liquid surface will be about 5 bars. Thus, the pressure above the liquid surface of the gas in the liquid phase may vary greatly depending on the composition of the gas. Furthermore, it is almost impossible to have knowledge of the exact mixture of gases in a tank of the said type. This is partly because the exact gas composition of a gas mixture may vary according to how full the tank is, partly since the gases are mixed with other more or less known gases in the tank, for example, remains of previously stored gases, water vapour, etc. Since the gas atmosphere, its temperature and pressure, influences the velocity of radar-transmitted microwaves in the space above the liquid surface, the level of the liquid surface determined by the radar will involve some uncertainty. To compensate for this in LPG tanks, transmitters that record pressure and temperature in the tank are used, whereupon it is possible, using algorithms with a large number of parameters, to calculate a usable value of the microwave signal's propagation velocity in the tank. In this case, it is an estimated velocity of the microwave that is used, not the velocity of the actual microwave signal. Therefore, if used under the described conditions, the radar level-measuring device cannot be used to measure flow of liquid in and out of the tank. Nor is it possible to use the radar level-measuring device as a level control, since it does not demonstrate the precision required when used in LPG tanks. It should also be noted that using sensors for temperature and pressure entails having more holes in the pressure tank, which is not desirable.

An alternative way of storing gas in the liquid phase, apart from in a tank as described above, is to use underground chambers. In such a situation, it is not possible to use a radar level-measuring device of the known type, since the measuring distance is too great and the gas atmosphere too uncertain. Instead, it is common to use a measuring method involving a float floating on the liquid surface and where the float is suspended on a long line from the upper part of the underground chamber. A sensitive scales, on which the line is wound, senses the change in the level of the float, as a result of which the changes in the liquid surface level can be calculated. This allows access to changes in the liquid surface level, even if it is not a real or true measurement of the current level. Associated with this method are other problems such as unrolling difficulties with the line, maintenance, etc.

It is also known how to calibrate a radar level-measuring device used for level determination of a medium in a tank. Examples of such a device are given in the patent document WO 90/09599. The device in this document shows that the radar level-measuring device in the wave-guide comprises a number of well-measured reference tags, which may be designed in different ways. Because of the presence of a polarization arrangement, the microwave from the radar can be turned from propagating in one plane of polarization used during measuring of the liquid level, to a new different plane of polarization, whereby in the new plane of polarization, the reference tags' known positions can be used to calibrate the radar level-measuring device. This calibration is performed when adjusting the measuring system during regular inspections, and is not done during ordinary level measuring. Calibration involves using a standard to obtain a correct value, with known variation, of the variable to be measured, which in this case is the level of the surface of a material in a tank. When this correct value is obtained, the measuring device is adjusted to this correct value. These calibrations are normally carried out on installation or during maintenance of the measuring device. For the present invention, calibration of this type is not applicable.

Everything described in the document WO 90/09599 is incorporated into the present patent document.

DESCRIPTION OF THE INVENTION

The invention entails in accordance with a first aspect that a method is provided for measuring, by means of radar, in an enclosed space in which a liquid is stored, the level of a liquid surface, where the method involves that:

a radar unit mounted on the roof of the enclosed space transmits a microwave signal downwards into the enclosed space through a waveguide that communicates with the liquid in the enclosed space, the transmitted microwave signal's polarization alters according to a predetermined time sequence in such a way that the signal is propagated alternately at least in a first and a second plane of polarization, the signal transmitted in the first plane of polarization is reflected by the liquid surface back to the radar unit, whereupon the signal's running time is measured, the signal in the second plane of polarization is reflected by at least one reference transmitter placed at a known distance from the radar unit, after which the microwave signal's velocity of propagation is measured, a calculating unit calculates the level of the liquid surface based partly on the time elapsed between the signals emitted and received by the radar unit, partly on the microwave signal's velocity of propagation.

The first and second planes of polarization are preferably arranged perpendicular to one another. This is accomplished by transmitting the microwave signals using two separate antennas, where these are arranged to transmit signals with an order of magnitude of 90 degrees difference between the planes of polarization. It is, of course, possible to allow more than two planes of polarization, where the reflected microwave signal performs different measuring tasks in the different planes.

Switching between transmission in the first and second plane of polarization is done suitably in a cyclic fashion, i.e. level measuring in the first plane of polarization is done during a first time interval, while measuring against the reference is done during a second time interval, where switching between both of these intervals occurs regularly with time. Measurements can periodically be performed in another way, without this regularity.

According to an additional aspect of the invention, a device for implementation of the method in accordance with the invention is presented. To achieve such a device the said antenna are incorporated and the control electronics are adapted to control the microwave head of the two different antenna, as well as control the microwave switch which distributes the microwaves from the radar to the intended antenna. Furthermore, the calculating unit is adapted to perform the described calculations. Alternatively, it is possible for one and the same antenna to be used, where the differently-polarized microwave signals are supplied to the antenna by separate feedings/connections, which involves the microwave electronics controlling a switch that connects the antenna to the desired feeding.

Some of the advantages provided by the aforementioned aspects of the invention are:

makes it possible to measure liquid levels with high accuracy in all types of tanks, in which a medium is stored, measuring liquid levels with high accuracy in LPG tanks will be facilitated, allows the use of radar level-measuring devices in underground chambers for LPG products special calibration of the radar level-measuring device in relation to known references, over and above the calibration that is done continuously in accordance with the invention, becomes unnecessary, sensors for measuring temperature and pressure in the storage space are superfluous, at least from a level-measuring point of view, a pressure transmitter for transmitting microwaves to compensate the calculated changes of the velocity of propagation in the gas atmosphere above the medium surface can be omitted, the radar level-measuring device provides information about actually measured level values, not values calculated from parameters, the accuracy of the measurement result means that certification for measuring levels in LPG tanks and liquid levels in underground chambers can be expected in accordance with the principle of the invention, it will be possible to obtain approval for a monaural radar level-measuring device for use as a level control in tanks and underground chambers, (a two-channel radar level-measuring device, the function of which is described in patent document WO01/02818 has been granted such an approval), data from the radar level-measuring device can be used to give information about the composition of the gas, since the same hardware, and to some extent even the same software, is used both for level measuring and for continuous calibration, there is no discrepancy between the measured values as a result of using different components in the two functions, which can occur if different channels are used for both functions.

DESCRIPTION OF EMBODIMENTS

Figure 2:
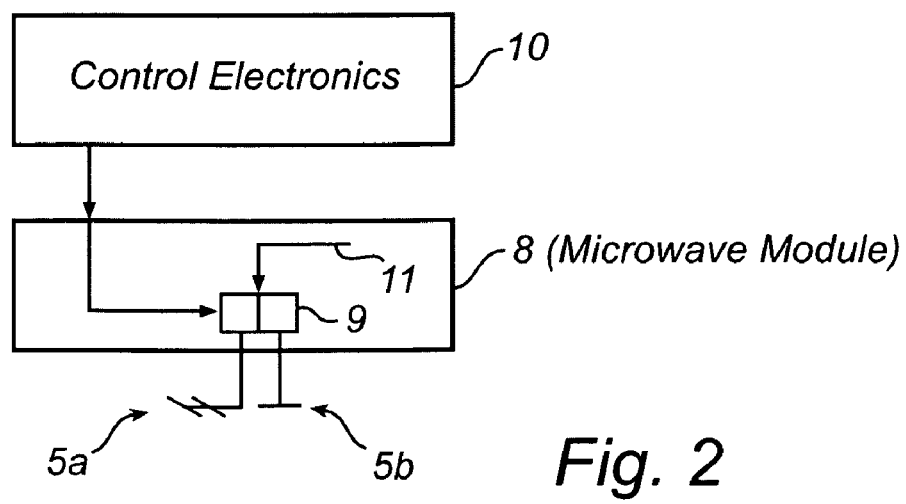
FIG. 2 shows schematically a radar level-measuring device with associated control electronics and separate antenna for two planes of polarization.

An example of an embodiment is described here with the aid of the attached FIG. 2. The drawing illustrates a block diagram of the function of a radar level-measuring device which uses the method and the device in accordance with the aspect of the invention.

Figure 1:
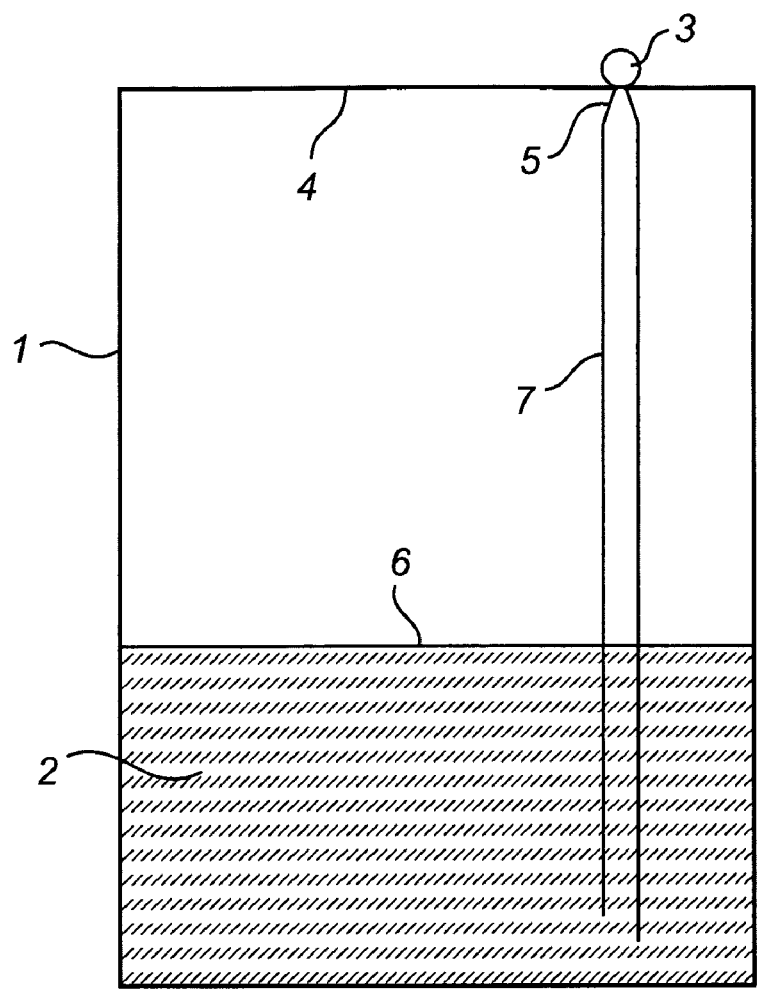
FIG. 1 shows schematically a radar level-measuring device in a tank for determining the level of the surface of a medium in a tank.

The principle of the radar level-measuring device is shown in FIG. 1. A tank 1 is used to store a medium 2. The medium may be a liquid, such as oil, refined products, and gas in liquid form, or be composed of a particulate material, i.e. a pulverised solid substance. A radar 3 is fixed to the roof 4 of the tank 1, from which a microwave beam is emitted from the radar via an antenna 5 on the inside of the tank. The emitted beam is reflected from the medium surface 6 and picked up by the antenna 5. A comparison and evaluation of the time delay between emitted and reflected beam in a calculating and control unit allows the level of the medium surface 6 to be determined in a known way. The drawing also shows that the microwave is transmitted via a pipeshaped waveguide 7, which communicates with the medium, which in this case is a liquid, through the openings in the wall of the waveguide.

In accordance with the invention, the device is comprised of a microwave module 8, which in the example is an FMCW radar. The radar is configured for transmission and reception of microwaves in at least the aforementioned planes of polarization, which are separated from each other at a right angle. One way of arranging the propagation of the microwave in two separate planes of polarization is to use two antennas 5a and 5b. It follows that these two antennas can, as in the example, be arranged in such a way that the microwaves are transmitted orthogonally to each other. In order to achieve transmission in both the first and the second plane of polarization, a microwave switch 9 is incorporated in the microwave module 8 to distribute the signal to the intended antenna 5a, 5b. A control electronics unit 10 is arranged to control the microwave signal, which is moved to and from the microwave switch 9 via the connection 11. One link in the control of the microwave signal is to determine the time sequence in which the change of antenna is to be performed, which can proceed cyclically or in another selected time sequence.

In comparison to previously known techniques for calculating the level of liquid surfaces, the electronics are supplemented with a calculating circuit that compensates for changes in the microwave's velocity in the atmosphere above the liquid surface. Normally, the level calculation is performed according to known techniques, so that the mean value of, for example, the last 10 measurement cycles is used as the end value, to be shown as the result, where updating is done continually for new measurement cycles. If, for example, every $11^{th}$ cycle comprises a measurement of the microwave velocity by measuring in the second plane of polarization, an estimation backwards of already calculated level values is made by correcting for the measured velocity of the microwave. It is, of course, possible to let, for example, every other cycle be a measuring cycle for the microwave's velocity and to correct the level measurement after each cycle, or to take a mean value of the velocity measurement for a number of the most recent velocity measuring cycles. An additional way to proceed is to measure the microwave's velocity first, and to use this value in the calculation of the liquid surface according to the above level-formula with some chosen time interval.

The reference transmitters to which the microwave measures the distance in the second plane of polarization is comprised of microwave reactances, which may be designed as rods in the wall of the pipe 7 or holes in the wall of the pipe 7. Alternative reactances that may be used are: slots in the waveguide wall, restrictions in the waveguide, different types of insert that affect one of the polarized signals more than the other.

The invention claimed is:

1. A method for measuring the level of a liquid surface in an enclosed space, in which a liquid, is stored, the method comprising:
    a radar unit mounted on the roof of the enclosed space transmits a microwave signal downwards into the enclosed space through a waveguide that communicates with the liquid in the enclosed space,
    the transmitted microwave signal's polarization alters according to a predetermined time sequence in such a way that the signal is propagated alternately at least in a first and a second plane of polarization,
    the signal transmitted in the first plane of polarization is reflected by the liquid surface back to the radar unit, whereupon the signal's running time is measured,
    the signal in the second plane of polarization is reflected by at least one reference transmitter placed at a known distance from the radar unit, after which the microwave signal's velocity of propagation is measured,
    a calculating unit calculates the level of the liquid surface based partly on the time elapsed between the signals emitted and received by the radar unit, partly on the microwave signal's velocity of propagation.

2. The method as in claim 1, where the first and second planes of polarization are arranged orthogonal to one another.

3. The method as in claim 1, where one and the same microwave signal is used for measuring the microwave's velocity of propagation, and for measuring the level of the liquid surface, and where the said microwave signal is directed to an arrangement for polarization of the signal in the first and second planes of polarization.

4. The method as in claim 3, where the microwave signal is directed to the intended polarization arrangement by a microwave switch.

5. The method as in claim 1, where measuring in the first plane of polarization is done during a first time interval, and measuring in the second plane of polarization is done during a second time interval, and where switching between the first and the second time intervals takes place cyclically.

6. The method as in claim 1, where measuring in the first plane of polarization is done during a first time interval, and measuring in the second plane of polarization is done during a second time interval, and where switching between the first and the second time intervals takes place irregularly.

7. A device for measuring-the level of a liquid surface in an enclosed space, where a radar unit transmits a microwave signal downwards into the enclosed space through a waveguide that communicates with the liquid in the enclosed space, and where the radar unit picks up the microwave signal a certain propagation time after it has been reflected by the surface, wherein the device comprises:
    a microwave source polarizing the microwave signal in at least first and second planes of polarization;
    control electronics measuring the microwave signal's propagation time in the first plane of polarization, and measuring the microwave signal's velocity in the second plane of polarization to known distance references fitted to the waveguide, where the measurements in the first and second planes of polarization are alternated according to a predetermined schedule, said control electronics further being arranged to, depending on the values of both the microwave signal's propagation time and its velocity, determine a value for said level.

8. The device as in claim 7, where the microwave source emits microwaves in planes of polarization that form an angle with each other.

9. The device as in claim 7, including a polarization selector which directs the microwave to an antenna that polarizes the microwave to propagate in the first and second planes of polarization.

10. The device as in claim 9, where the microwave reactances are composed of any of the microwave reactances from the following group: rods in the wall of the waveguide, holes in the wall of the waveguide, restrictions in the waveguide, waveguide inserts with reactance influenced by the polarization.

11. The device as in claim 7, where the distance references are comprised of microwave reactances which give rise to a microwave reactance at known distance from the radar unit, mainly in one of the planes of polarization.

12. The device as in claim 7 wherein the microwave source comprises an antenna.

13. The device as in claim 7 including a microwave switch selecting between the first and second polarizations.

* * * * *